(12) United States Patent
Xu

(10) Patent No.: US 7,219,048 B1
(45) Date of Patent: May 15, 2007

(54) METHODOLOGY AND APPLICATIONS OF TIMING-DRIVEN LOGIC RESYNTHESIS FOR VLSI CIRCUITS

(75) Inventor: Songjie Xu, Los Angeles, CA (US)

(73) Assignee: Magma Design Automation, Inc., San Jose, CA (US)

( * ) Notice: Subject to any disclaimer, the term of this patent is extended or adjusted under 35 U.S.C. 154(b) by 585 days.

(21) Appl. No.: 09/754,406

(22) Filed: Jan. 2, 2001

(51) Int. Cl.
G06F 17/50 (2006.01)
G06F 9/455 (2006.01)

(52) U.S. Cl. .............................. 703/19; 716/6
(58) Field of Classification Search ................. 703/19, 703/14; 716/2, 6
See application file for complete search history.

(56) References Cited

U.S. PATENT DOCUMENTS 5,648,913 A * 7/1997 Bennett et al. ................. 716/6

OTHER PUBLICATIONS

Singh, K.J., Performance Optimization of Digital Circuits, Ph.D. Dissertation, University of California Berkley, 1992.*
Singh et al, "Timing Optimization of Combinational Logic", Computer-Aided Design, 1988. ICCAD-88. Digest of Technical Papers., IEEE International Conference, Nov. 7-10, 1988, pp. 282-285.*
Huang et al, "An Iterative Area/Performance Trade-Off Algorithm for LUT-Based FPGA Technology Mapping" Computer-Aided Design, 1996. ICCAD-96. Digest of Technical Papers., 1996 IEEE/ACM International Conference on , Nov. 10-14, 1996 pp. 13-17.*
Singh et al, "A Heuristic Algorithm for the Fanout Problem", 27th ACM/IEEE Design Automation Conference, 1990, pp. 357-360.*
Ju et al "Incremental Techniques for the Identification of Statistically Sensitizable Critical Paths", 28th ACM/IEEE Design Automation Conference, Paper 32.2, pp. 541-546, 1991.*
Chen et al., Combining Technology Mapping and Placement for Delay-Optimization in FPGA Designs 1993 Unvi. of Tsing Hua IEEE p. 123-127.*
Cong et al., "Delay-Optimal Technology Mapping for FPGAs with Heterogeneous LUTs" 1998 ACM p. 704-707.*
Murgai et al., "Performance Directed Synthesis for Table Look Up Programmable Gate Arrays" 1991 IEEE p. 572-575.*
Changfan et al., "Timing Optimization on Routed Design with Incremental Placement and Routing Characterization" 2000 IEEE p. 188-196.*
Singh, K.J., Performance Optimization of Digital Circuits, Ph.D. Dissertation, pp. 33-79, University of California at Berkeley, 1992.

(Continued)

*Primary Examiner*—Anthony Knight
*Assistant Examiner*—Tom Stevens
(74) *Attorney, Agent, or Firm*—Knobbe Martens Olson & Bear, LLP

(57) ABSTRACT

Aspects of the present invention include a methodology for the general timing-driven iterative refinement-based approach, a timing-driven optimization (TDO) method that optimizes the circuit depth after the area oriented logic optimization, and a layout-driven synthesis flow that integrates performance-driven technology mapping and clustering with TDO to account for the effect of mapping and clustering during the timing optimization procedure of TDO. The delay reduction process recursively reduces the delay of critical fanins of a selected. Furthermore, in one embodiment, the fanins of the selected node are sorted according to their slack values.

33 Claims, 10 Drawing Sheets

OTHER PUBLICATIONS

Pan, P., Performance-Driven Integration of Retiming and Resynthesis, in Proc. Design Automation Conf., pp. 243-246, 1999.

Tamiya, Y., Performance Optimization Using Separator Sets, in Proc. Int'l Conf. On Computer Aided Design, pp. 191-194, 1999.

Sentovich et al., SIS: A System for Sequential Circuit Synthesis, Electronics Research Laboratory, Memorandum No. UCB/ERL M92/41, 1992.

Hwang, Y.-Y., Logic Synthesis for Lookup-Table Based Field Programmable Gate Arrays, Ph.D. Dissertation, pp. 35-63, University of California at Los Angeles, 1999.

Yang, S., Logic Synthesis and Optimization Benchmarks User Guide Version 3.0, Technique Report, MCNC, Jan. 1991.

Songjie Xu, *Synthesis for High-Density and High-Performance FPGAs*, dissertation submitted to University of California, Los Angeles, Aug. 31, 2000.

Singh, Kanwar Jit, Ph.D., *Performance Optimization of Digital Circuits*, dissertation submitted to University of California, Berkeley, 1992.

* cited by examiner

METHODOLOGY AND APPLICATIONS OF TIMING-DRIVEN LOGIC RESYNTHESIS FOR VLSI CIRCUITS

BACKGROUND OF THE INVENTION

1. Field of the Invention

Aspects of the present invention generally relate to computer aided engineering of logic circuits. More particularly, embodiments of the present invention relate to timing optimization of logic circuits.

2. Description of the Related Technology

In general, logic optimization is classified into two categories, two-level logic optimization and multi-level logic optimization.

Two-level optimization deals with the optimization of combinational logic circuits, modeled by two-level "sum of products" expression forms, or equivalently by tabular forms such as implicant tables. Two-level logic optimization has a direct impact on programmable logic arrays (PLAs) and macro-cell based programmable logic devices (CPLDs).

Combinational logic circuits are very often implemented as multi-level networks of logic gates. The fine granularity of multi-level networks provides several degrees of freedom in logic design that may be exploited in optimizing area and delay as well as in satisfying specific constraints, such as different timing requirements on different input/output paths. Thus, multi-level networks are very often preferred to two-level logic implementations such as PLAs. The unfortunate drawback of the flexibility in implementing combinational functions as multi-level networks is the difficulty of modeling and optimizing the networks themselves. The need of practical synthesis and optimization algorithms for multi-level circuits has made this topic of high importance in VLSI CAD.

Multi-level logic optimization is frequently partitioned into two steps. In the first step, a logic network is optimized while neglecting the implementation constraints on the logic gates and assuming rough models for their area and performance. This procedure is usually referred to as technology independent logic optimization. In the second step, one takes into consideration the constraints on the available gates (e.g., K-LUTs in FPGAs) as well as the detailed area and delay models of these gates. This step is the so-called technology dependent logic optimization or technology mapping. The discussion hereinbelow addresses the technology independent logic optimization problem, and, in particular, the timing-driven logic resynthesis problem.

Several common operations that are used during the area-oriented multi-level optimization are as follows:

1. Common Sub-Expression Extraction

By extracting common sub-expressions from a number of functions, the circuit area is reduced. However, the better the area saving, the more places the sub-expression fans out to, which could degrade the circuit performance.

2. Resubstitution

Resubstitution is similar to common sub-expression extraction and involves expressing a node in terms of another, if possible.

3. Elimination

Elimination involves removing, from the multi-level network, all occurrences of variables that represent the nodes which are eliminated. When all the internal nodes are eliminated, the operation is called collapsing.

4. Decomposition

The decomposition of an internal node function in a multi-level network replaces the node by two (or more) nodes that form a subnetwork equivalent to the original node. Decomposition is often performed on a node to split a complex function into two (or more) simpler functions. Small-sized expressions are more likely to be divisors of other expressions and may enhance the ability of the resubstitution algorithm to reduce the size of the network.

5. Simplification Using Don't Care Conditions

Simplification is used to find a compact representation for the Boolean function at every node. By removing the redundancies from a representation of a function, both the size and the depth can be reduced. In a multi-level network, the simplification at a node needs to consider the structure of the logic around it. This gives rise to don't care conditions that can be exploited during node simplification.

From the description of these operations, one can see the complex interaction between the circuit area and delay. In addition, the delay impact of a particular transformation applied on the same network often depends on the delay data (the arrival and required times). Since the delay data is imprecise at the technology independent stage, it is difficult to adapt the strategies used for area optimization to address the performance optimization issue. Because of this difficulty, many of the techniques developed to reduce the circuit delay use local transformations to make incremental changes to the logic.

Timing optimization will now be discussed. One significant issue in restructuring a circuit is determining circuit regions that should be transformed. The most critical outputs and their transitive fanins are a natural choice. However, one problem with this approach is that after the most critical outputs have been optimized, outputs that were close to being critical before could become critical after optimization of the original critical paths. Moreover, optimizing only the most critical outputs by more than the needed amount can also result in an unnecessary area penalty. Thus, some techniques optimize close-to-critical nodes along with the most critical nodes.

Several conventional algorithms use an iterative refinement-based approach, where, in each iteration, a set of critical paths is identified and then the delays of a set of nodes are reduced so that the overall circuit performance is improved. These algorithms are differentiated in (i) how to determine in each iteration the set of nodes to apply the local transformation for delay reduction and (ii) the local transformation method itself.

Another conventional attempt at timing optimization takes a different approach based on clustering, partial collapsing and subsequent timing optimization. This approach is based on the premise that at a technology-independent level, in the absence of the target technology information and wiring delays, any delay model is inaccurate. Therefore, it assigns a zero delay to all the gates, thus treating all the input-to-output paths uniformly. However, whenever a signal crosses cluster boundaries, a delay of one unit is incurred.

Another existing approach first performs area optimization on a circuit to achieve to reduce the size of the circuit layout, and then incremental changes are made to the circuit to reduce its delay. This approach is particularly useful for layout-driven logic resynthesis, wherein the timing correction step is performed incrementally to ensure the convergence of the iteration between the layout design and the circuit resynthesis.

A significant aim of the restructuring approaches discussed above is to generate a good multi-level structure of the circuit that will subsequently be mapped into a small delay implementation. These conventional approaches generally use simple, weak models to predict the circuit delay. As a result, the savings observed at the technology independent stage may not be evident after technology mapping of the optimized circuit.

To alleviate this problem, researchers have extended the basic ideas of the technology independent optimizations to work on mapped circuits. Heuristics have been used to address the optimization of mapped circuits while taking into account the characteristics of the cell library.

The Timing-Driven Logic Optimization section discussion below describes the performance optimization at the technology independent level and how this optimization impacts the subsequent technology mapping and physical design.

With the rapid scaling of transistor feature sizes, integrated circuit performance is increasingly determined by interconnects instead of devices. Interconnect delays are even more significant in PLD designs due to the extensive use of programmable switches. As a result, the delay between two logic blocks is highly dependent on their placement on the chip and the routing resources used to connect them. PLDs, such as those from Altera, include several types of interconnects, including local, row and column interconnects. Local interconnects refer to the connections between logic elements (LEs) in the same logic array block (LAB). Row interconnects refer to the connections between LEs in the same row, but in different LABs. Column interconnects refer to the connections between LEs in different rows. The delay attributed to interconnects can be many times that of the logic element delay. Given such a high variation of different types of interconnect delays, it would be almost impossible to perform accurate timing optimization during synthesis without proper consideration of the layout result. That is why layout-driven synthesis is considered to be an important problem area in high-performance PLD designs.

The layout-driven synthesis problem has proved to be difficult to solve due to the mutual dependency nature of the logic synthesis and layout design. In general, there are two approaches to integrate logic and layout synthesis. One approach is to employ a highly iterative design flow. It follows the design steps in the traditional design flow, but feeds the layout result in the current iteration back to the logic synthesis tools for improving the synthesis results in the next iteration. To make such a "construct-by-correction" approach effective, the correction step needs to be done incrementally with respect to the information fed back by layout. However, a different approach completely remaps the entire circuit based on the information fed back from the layout design, making it difficult to guarantee any convergence when performing the iteration between layout and synthesis.

Another conventional approach is to use a concurrent design flow, which performs logic synthesis/technology mapping and placement/routing concurrently. However, the optimality of such an approach usually holds for very special circuit structures (such as trees) and the main difficulty associated with this approach is its high computational complexity.

Clearly, a better technique is needed for an effective and efficient layout-driven synthesis flow. Such a technique should consider layout information during synthesis and design planning, such as by combining logic partitioning with retiming and proper consideration of global and local interconnect delays, or by exploiting fast interconnects available in many PLD architectures during technology mapping.

As the capacity of PLD devices increases, hierarchical architectures are being more widely used, where basic programmable logic blocks, such as look-up tables (LUTs) or macrocells, are grouped into a logic cluster and connected by local programmable interconnects inside the cluster. There are basically two types of clusters, hard-wired connection-based clusters (HCC) and programmable interconnect-based clusters (PIC). The layout-driven synthesis flow described below is mainly targeted for the PIC-based FPGA architectures, although, in other embodiments, other architectures are targeted.

In a PIC, a group of basic logic blocks are connected by a local programmable interconnection array that usually provides full connectivity and is much faster than global or semi-global programmable interconnects. A number of commercial PLDs use the PIC architecture, such as the logic array block (LAB) in Altera FLEX 10K and APEX 20K devices, and the MegaLAB in APEX 20K devices. For example, in FLEX 10K devices, each LAB consists of eight 4-LUTs connected by the local interconnect array. Multi-level hierarchy can be formed easily using PICs, in which a group of small (lower-level) PICs may be connected through a programmable interconnect array at this level to form a larger (higher-level) PIC. For example, in Altera APEX 20K FPGAs, each LAB consists of ten 4-LUTs connected by local interconnects, which forms the first-level PIC. Then, 16 such LABs, together with one embedded system block and another level of programmable interconnects, form a second level PIC, called MegaLAB. Finally, global interconnects are used to route between MegaLAB structures and to I/O pins.

Conventional PLD synthesis algorithms often transform a given design into a flat netlist of basic programmable logic blocks (such as LUTs or macrocells) without consideration of the device hierarchy. Therefore, a substantial challenge in this area is to be able to synthesize a given design directly into a multi-level hierarchical architecture, with consideration of different interconnect delays and clustering constraints at each level.

SUMMARY OF THE INVENTION

Aspects of the present invention provide a solution for the timing-driven logic resynthesis or timing optimization problem, which provides for much more efficient logic synthesis with improved results as compared to conventional synthesis techniques. The disclosed timing-driven logic resynthesis technique can be applied at various design stages. It may be applied during a technology independent stage after area oriented logic optimization to minimize or reduce the depth of the circuit, or after technology mapping is performed. The timing-driven logic resynthesis techniques can also be integrated into a layout-driven synthesis flow to reduce the overall circuit delay.

One embodiment of the novel timing-driven logic resynthesis technique includes (i) a methodology for the general timing-driven iterative refinement-based approach, (ii) a novel timing-driven optimization algorithm, named TDO, as an application of the new methodology, for optimizing the circuit depth after area oriented logic optimization, and (iii) a layout-driven synthesis flow, as another application of the new methodology, that integrates performance-driven technology mapping and clustering with TDO to account for the effect of mapping and clustering during the timing optimization procedure of TDO.

Embodiments incorporating the novel methodology for the general timing-driven iterative refinement-based approach have some or all of the following characteristics and advantages:
1. The need for the (incremental) timing analysis during the iterative refinement procedure is reduced or eliminated.
2. The local transformation is able to see and use more accurate timing information (e.g., the arrival times at the transitive fanin signals) so that the transformations can be conducted in a more meaningful way to reduce the circuit delay.
3. Design preferences can be much more easily considered because of the flexibility of the methodology (e.g., in hybrid FPGAs with both LUT clusters and Pterm blocks, it is better to use the same logic resources consecutively on a critical path so that the subsequent clustering procedure can pack these implementations into one cluster to reduce the circuit delay).
4. A general framework is provided which allows the integration of several types of local transformations, such as logic resynthesis, mapping, clustering, and so on, to enable an integration of currently separated design processes.

As an application of the new methodology, the TDO method integrates the novel methodology for the general timing-driven iterative refinement-based approach and the area recovery technique using restrictive iterative resubstitution. It is able to outperform the state-of-the-art algorithms consistently while significantly reducing the run time.

DETAILED DESCRIPTION OF THE PREFERRED EMBODIMENTS

The following detailed description presents a description of certain specific embodiments of the present invention. However, the present invention may be embodied in a multitude of different ways as defined and covered by the claims. In this description, reference is made to the drawings wherein like parts are designated with like numerals throughout.

A novel methodology or process of timing optimization based on iterative refinement will be described. Use of this novel methodology reduces or eliminates the need for (incremental) timing analysis during the iterative refinement procedure and any local transformation is able to utilize the more accurate timing information from the recursive delay reduction process described below. The timing-driven logic resynthesis or synthesis methodology utilizes a delay reduction process to reduce the delay of node v. The delay reduction process attempts to recursively reduce the delay of the critical fanins of node v instead of conducting the local transformation for v directly. Furthermore, in one embodiment, the fanins of node v are sorted in non-ascending order according to their slack values in non-ascending order. Thus, the fanins that have bigger negative slack values and hence are easier to speed up are processed before those fanins that have smaller negative slack values and hence are more difficult to speed up. The novel optimization methodology is able to outperform the state-of-the-art algorithms consistently while significantly reducing the run time.

Figure 1:
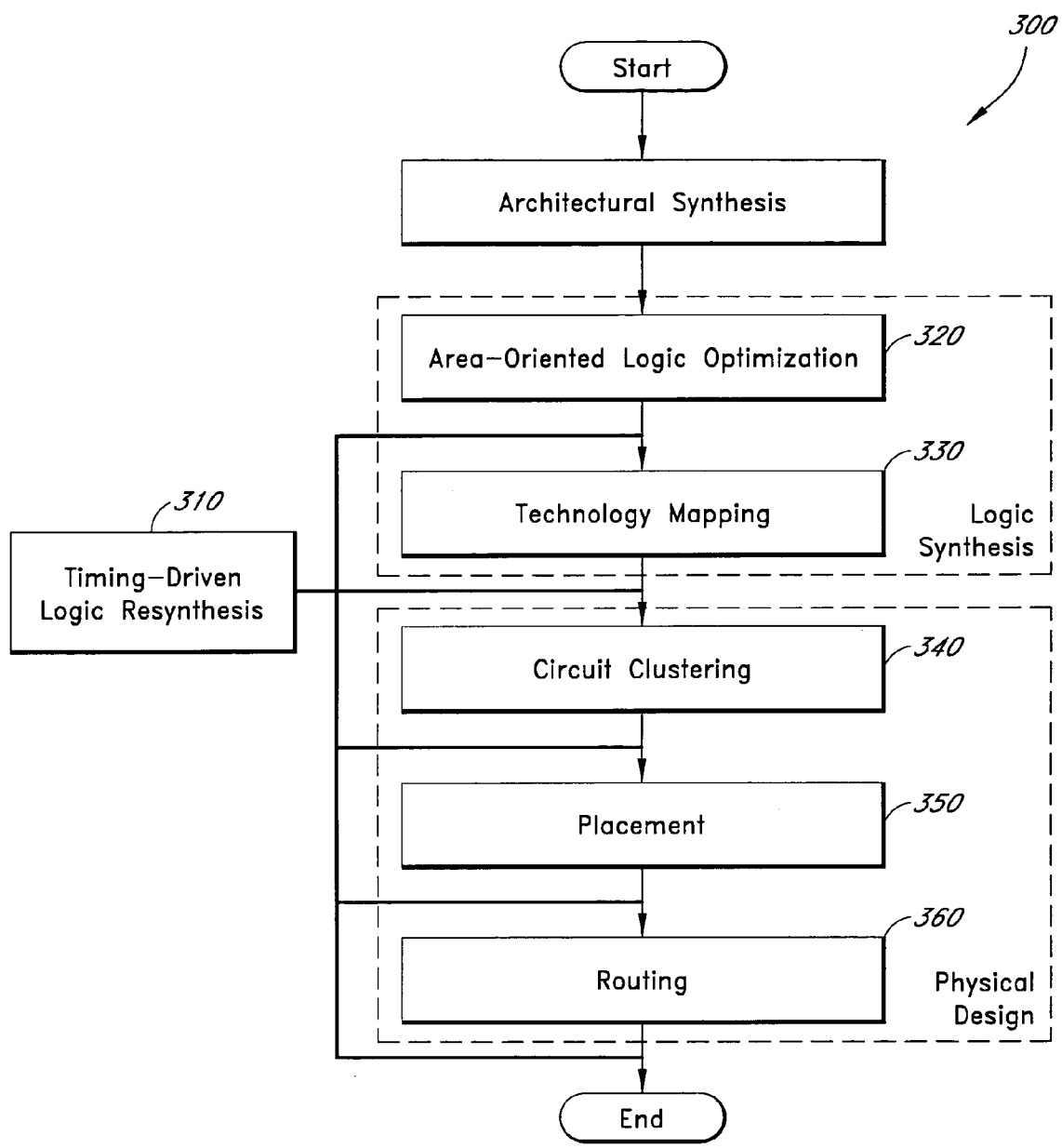
FIG. 1 is a diagram of where the timing-driven logic resynthesis aspect of the invention may be applied in an exemplary design flow.

In an exemplary design flow 300 shown in FIG. 1, a timing-driven logic resynthesis technique 310 may be applied to minimize the depth of the circuit during a technology independent optimization stage after the area oriented logic optimization 320 is performed, or after technology mapping 330 is performed. The timing-driven logic synthesis technique 310 can also be integrated into a layout-driven synthesis flow (e.g., after circuit clustering 340, after placement 350, or after routing 360) to reduce the overall circuit delay.

The remainder of this document is organized as follows: a Problem Formulation and Concepts section, a Timing-Driven Logic Optimization section, an Application to PLD Synthesis section, and a Conclusions section. The Timing-Driven Logic Optimization section discusses a novel methodology for performance-driven iterative refinement-based approaches and a novel timing-driven optimization method. The impact of technology independent timing optimization on circuit performance after technology mapping, clustering and layout design is also discussed.

Problem Formulation and Concepts

A Boolean network N may be represented as a directed acyclic graph (DAG) where each node represents a logic gate, and a directed edge $<i,j>$ exists if the output of gate i is an input of gate j. Primary input (PI) nodes have no incoming edge and primary output (PO) nodes have no outgoing edge. Input(v) is used to denote the set of fanins of gate v, and output(v) is used to denote the set of nodes which are fanouts of gate v. Given a subgraph H of the Boolean network, input(H) denotes the set of distinct nodes outside H which supply inputs to the gates in H. Node u is the transitive fanin or predecessor of node v if there is a path from u to v. Similarly, node u is the transitive fanout of node v if there is a path from v to U. The level of a node v is the length of the longest path from any PI node to v. The level of a PI node is zero. The depth of a network is the highest node level in the network. A Boolean network is K-bounded if $|input(v)|<K$ for each node v in the network.

For a node v in the network, a fanin cone (also referred to as a predecessor cone or transitive fanin cone) at v, denoted $C_v$, is a subgraph consisting of v and its predecessors such that any path connecting a node in $C_v$ and v lies entirely in $C_v$. The root of $C_v$ is called v. $C_v$ is K-feasible if |input($C_v$)| $\leq$ K. For a node v in the network, a fanout cone (also referred to as a transitive fanout cone) at v, denoted $D_v$, is a subgraph consisting of v and its transitive fanouts such that any path connecting v and a node in $D_v$ lies entirely in $D_v$. The root of $D_v$ is called v.

The delay modeling of digital circuits is a complex issue. Certain basic concepts, well known to one of ordinary skill in the art, are presented herein to more fully illustrate the operation of the algorithms. In a Boolean network, it is assumed that each node has a single output with possibly multiple fanouts and that there is zero or one edge or interconnect from one node to another node. The timing concept for single-output nodes can be easily generalized to the case of multiple-output nodes. The concepts of pin-to-pin delay and edge delay are defined as follows.

Definition 1: The pin-to-pin delay $d_i(v)$ of a node v in a Boolean Network N is the propagation delay from the ith input (pin) of node v to the output (pin) of node v.

Definition 2: The edge delay d(u,v) of a edge <u,v> in a Boolean network N is the propagation delay from the output (pin) of the node u to the corresponding input (pin) of the node v.

In the delay models where the interconnection (edge) delay is a constant, the edge delay may be combined into the pin-to-pin delay for a more simplistic, yet sufficiently accurate, delay modeling.

Given the propagation delays of each node and connections in a netlist, each PI, PO or output of every node v is associated with a value called the arrival time t(v), at which the signal it generates would settle. The arrival times of the primary inputs denote when they are stable, and so the arrival times represent the reference points for the delay computation in the circuit. Often the arrival times of the primary inputs are zero. Nevertheless, positive input arrival times may be useful to model a variety of effects in a circuit, including specific delays through the input pads or circuit blocks that are not part of the current logic network abstraction.

The arrival time computation may be performed in a variety of ways. A model is considered herein that optionally divorces the circuit topology from the logic domain, i.e., arrival times are computed by considering the dependencies of the logic network graph only and excluding the possibility that some paths would never propagate events due to the specific local Boolean functions. The arrival time t(v) at the output of each node v may be computed as follows. Let $u_i$ be the ith fanin node of v, then $$t(v) = \max(t(u_i) + d(u_i, v) + d_i(v)) 0 \leq i < |\text{input}(v)| \qquad (1)$$

The arrival times may be computed by a forward traversal of the logic network in O(n+m) time, where n and m are the number of nodes and number of edges in the network, respectively. The maximum arrival time occurs at a primary output, and it is called the critical delay of the network. The propagation paths that cause the critical delay are called critical paths.

The required time at the output of every node v, denoted as $\bar{t}(v)$, is the required arrival time at v in order to meet the overall circuit timing constraint. The required times may be propagated backwards, from the POs to the PIs, by way of a backward network traversal. Let $u_i$ be the ith fanout node of v, and v be the jth fanin of node $u_i$, then:

$$\bar{t}(v) = \min(\bar{t}(u_i) - d_j(u_i) - d(v, u_i)) 0 \leq i < |\text{output}(v)| \qquad (2)$$

The difference between the required time and the actual arrival time at the output of each node is referred to as timing slack, namely:

$$s(v) = \bar{t}(v) - t(v) \qquad (3)$$

The required times and the timing slacks may be computed by the backward network traversal in O(n+m) time, where n and m are the number of nodes and number of edges in the network, respectively. Critical paths are identified by nodes with zero slack, when the required times at the primary outputs are set equal to the maximum arrival time.

For each node v in the Boolean network N, d-fanin-cone and d-critical-fanin-cone may be defined as follows.

Definition 3: The d-fanin-cone of a node v in a Boolean network N is the set of nodes that meet the following requirements:
 1. They are in the transitive fanin cone of node v; and
 2. they are at most distance d (d levels of logic) away from the node v.

Definition 4: The d-critical-fanin-cone of a node v in a Boolean network N is the set of nodes that meet the following requirements:
 1. They are in the d-fanin-cone of node v; and
 2. each of them has a negative slack.

The timing optimization problem for multi-level networks during the technology independent stage may be formulated as follows:

Problem 1: Given a K-bounded Boolean network N, transform N to an equivalent K-bounded network N so that the circuit depth is minimized.

The general timing optimization problem for multi-level networks concerning the circuit delay after the layout design may be formulated as follows:

Problem 2: Given a K-bounded Boolean network N, transform N to an equivalent K-bounded network N' so that the circuit delay after the layout design is minimized.

Timing-Driven Logic Optimization

Figure 3:
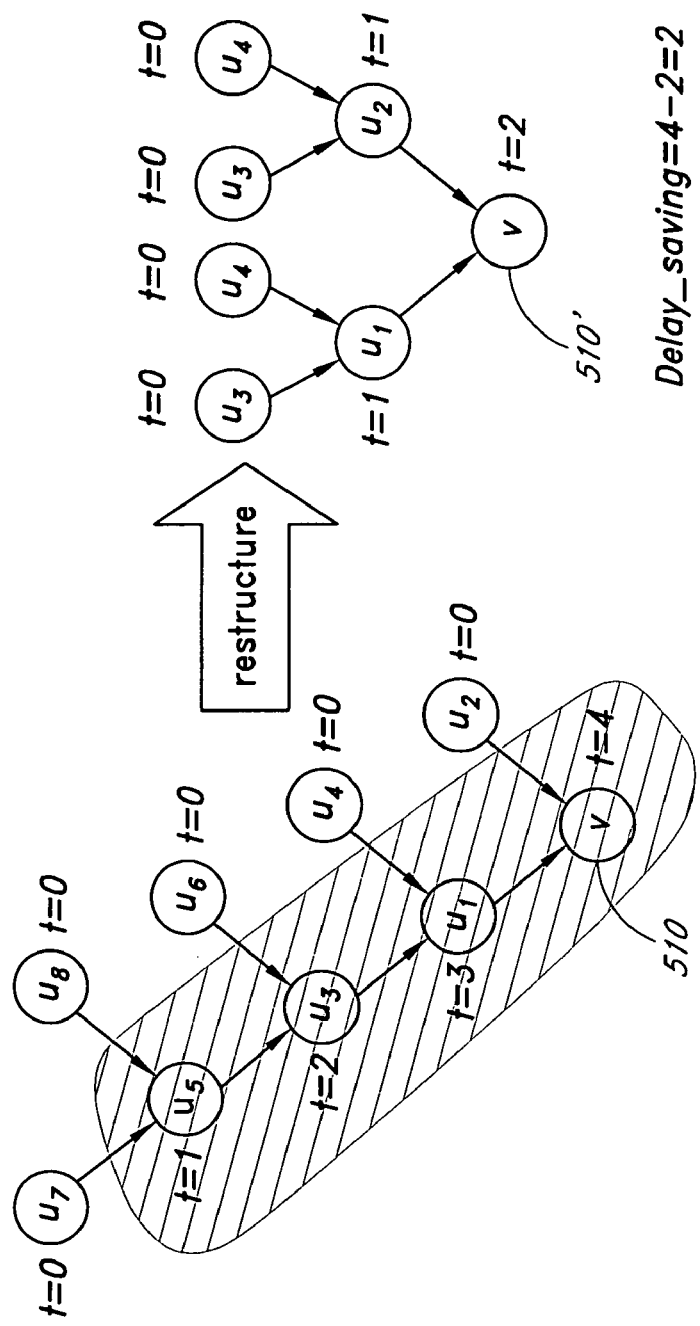
FIG. 3 is a diagram showing an exemplary local transformation where a local region is resynthesized to reduce logic delay.

Timing-driven logic resynthesis is typically conducted using an iterative refinement-based approach on the critical netlist due to the potential area penalty associated with the local transformations for delay reduction. In each pass (or iteration), the overall circuit delay target, which is smaller than the current maximum arrival time is set, and a set of local transformations are selected to meet this delay target. An exemplary local transformation is shown in FIG. 3 where a local region is resynthesized to reduce delay. Node v (510) before resynthesis has t=4, while after resynthesis, node v (510') has t=2, for a delay savings of 2. If the delay target is met, the whole process is repeated to meet a new delay target. The timing resynthesis stops when it is not possible to reduce the circuit delay any more. In contrast to the conventional method, one embodiment of the present invention advantageously reuses delay optimizations from each iteration.

The novel methodology for the general timing-driven iterative refinement-based approach is described in subsection A below. This methodology is applied to the novel method, called herein TDO (timing-driven optimization), for optimizing the circuit depth after the area oriented logic optimization in subsection B. The comparison of TDO with the conventional timing-driven logic optimization approaches is described in subsection C.

Figure 2:
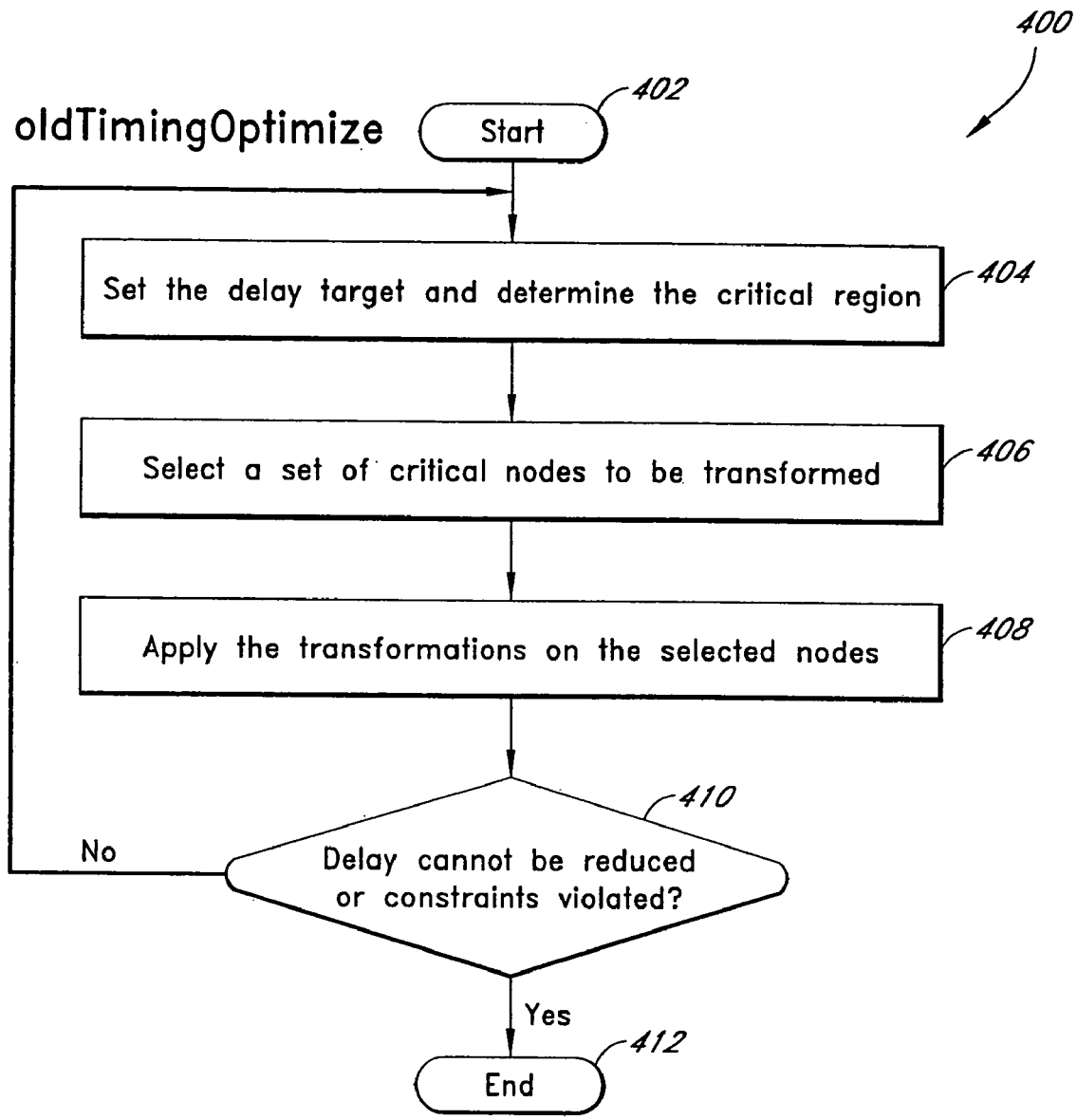
FIG. 2 is a flow chart of a generic conventional iterative refinement timing optimization procedure (oldTimingOptimize).

A. A Novel Methodology for Performance-Driven Iterative Refinement Approaches The present invention, which utilizes performance-driven iterative refinement based on timing considerations, offers several important advantages over conventional approaches. Conventional timing optimization algorithms generally use the generic iterative refinement procedure 400 shown in FIG. 2. One embodiment of the procedure 400 may be performed by the pseudo-code shown in Table I.

This procedure template 400 (oldTimingOptimize) may be customized to yield specific algorithms by changing state 404 and state 406 of the optimization loop, or by using different transformations at state 408. The oldTimingOptimize procedure 400 was discussed in (Singh, K. J., Performance Optimization of Digital Circuits, *Ph.D. Dissertation, University of California at Berkeley*, 1992), where each of the three states 404, 406, 408 was studied and the appropriate strategies applied. As the result, the algorithm proposed in (Singh, K. J., Performance Optimization of Digital Circuits, *Ph.D. Dissertation, University of California at Berkeley*, 1992) is able to generate solutions with better qualities than the previous approaches using this iterative refinement procedure, however, with a rather long and unpredictable computation time. Both the good quality of the solution and the long run time are due to the Binary Decision Diagram (BDD) based approach used in state 406 (transformation selection). A recent study (Tamiya, Y., Performance Optimization Using Separator Sets, in *Proc. Int'l Conf. On Computer Aided Design*, pages 191–194, 1999) tries to speed up the transformation selection procedure by computing multiple separator sets instead of using BDDs, however, the quality of results is not as good.

TABLE I

Template oldTimingOptimize(N)

|   | repeat |
|---|---|
| 1 | set the delay target and determine the critical region |
| 2 | select a set of critical nodes to be transformed |
| 3 | apply the transformations on the selected nodes |
|   | until the delay cannot be reduced or constraints are violated |
|   | traditional timing optimization procedure |

Figure 4:
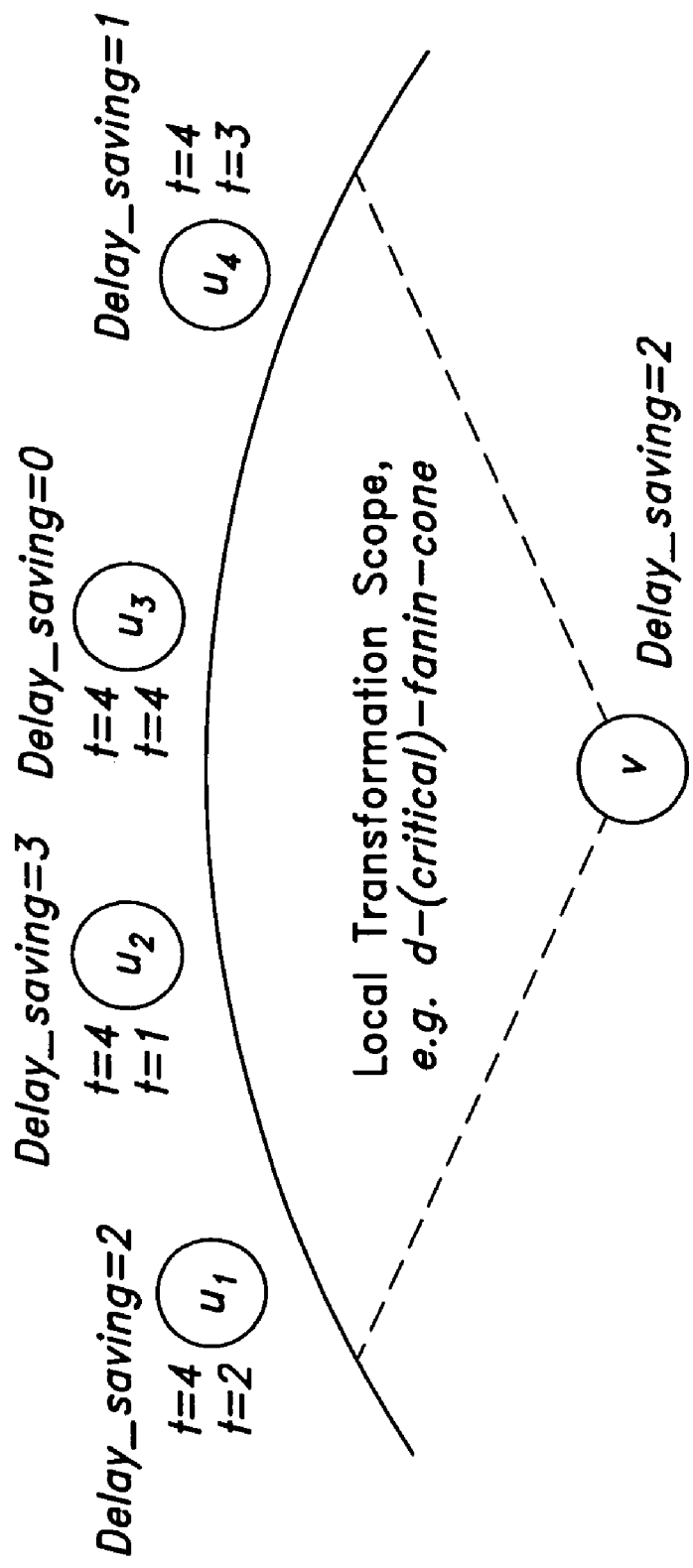
FIG. 4 is a diagram showing a deficiency of the oldTimingOptimize procedure where an exemplary local transformation does not use accurate timing information.

Instead of perfecting the oldTimingOptimize flow, it was discovered, however, that this procedure has the following intrinsic disadvantages:

1. When the local transformations are evaluated for delay reductions at each critical node at state 406, it is assumed implicitly that the arrival times of the transitive fanins of this node will not be changed. This is generally not true with the iterative refinement-based approach. Thus, the local transformations conducted on the selected nodes at state 408 do not use the most up-to-date timing information, such as seen in FIG. 4. Although the algorithm in (Pan, P., Performance-Driven Integration of Retiming and Resynthesis, in *Proc. Design Automation Conf.*, pages 243–246, 1999) allows the transformations to use the accurate timing information by propagating the arrival times from PIs to POs, it disadvantageously invalidates the assumptions for the node selection at state 406, which are based on the old timing information.

2. Depending on how the transformation at state 408 is conducted (whether to propagate the arrival times from PIs to POs), it may require the (incremental) timing analysis after each iteration of the delay reduction.

Overcoming these problems is crucial for the timing optimization of today's high-performance FPGAs. Therefore, there is a need for a new methodology in performing timing optimization based on the iterative refinement. One embodiment of the novel methodology is described in conjunction with FIG. 5 and FIG. 6.

The novel methodology or process of timing optimization based on iterative refinement eliminates or reduces the need for incremental timing analysis during the iterative refinement procedure. The novel methodology enables any local transformation to be able to utilize more accurate arrival times at the transitive fanin signals. The timing optimization methodology utilizes a delay reduction process to reduce the delay of node v. The delay reduction process attempts to recursively reduce the delay of the critical fanins of node v instead of conducting the local transformation for v directly. In one embodiment, the critical PO nodes may be sorted according to their slacks in non-ascending order. The PO nodes that have bigger negative slack values and, thus, are easier to speed up, are processed before the PO nodes that have smaller negative slack values, as will be further described below.

Figure 5:
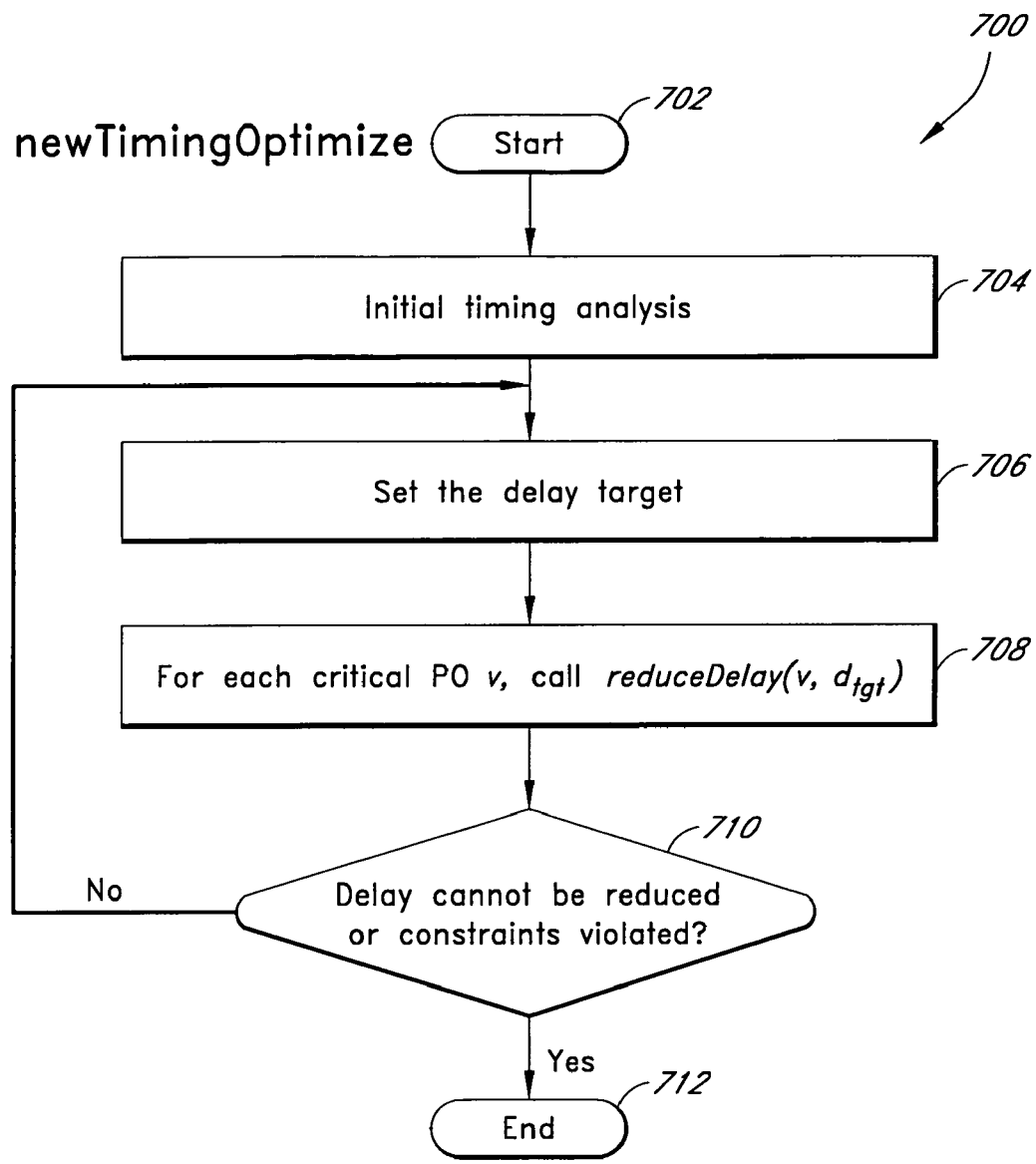
FIG. 5 is a flow chart of a novel iterative refinement timing optimization process (newTimingOptimize).

Referring to FIG. 5, the overall flow of a newTimingOptimize process 700 will be described. Portions of states 704 and 706 (described hereinbelow) may be customized by the specific timing optimization method. One embodiment of the process 700 may be performed by the pseudo-code shown in Table II.

TABLE II procedure newTimingOptimize(N)

| | |
|---|---|
| 1 | do an initial timing analysis with arrival times computed for every node in N and circuit_delay is the maximum arrival time in the circuit |
| 2 | set the initial delay reduction step reduce_step* |
| 3 | repeat |
| 4 | ckt_delay_target = ckt_delay − reduce_step |
| 5 | success = true |
| 6 | for each critical primary output v in non-ascending order according to the current negative slack do |
| 7 | if reduceDelay(v, ckt_delay_target) == false then |
| 8 | success = false |
| 9 | break |
| 10 | if success == true then |
| 11 | ckt_delay = ckt_delay_target |
| 12 | else |
| 13 | adjust reduce_step* |
| 14 | prepare for the next iteration* |
| 15 | until the delay cannot be reduced or constraints are violated |

Beginning at a start state 702, process 700 proceeds to state 704 and performs an initial timing analysis. The initial timing analysis computes the arrival times for each node in N. The circuit delay, denoted as ckt_delay, is the maximum arrival time. An initial delay reduction step (reduce_step) is then selected, which controls the pace of the timing optimization. Continuing at state 706, the first operation in each timing optimization iteration of process 700 is to choose or set the delay target (ckt_delay_target) based on the current circuit delay (ckt_delay) and a given delay reduction step (reduce_step). A flag labeled success indicates whether the delay target may be met in one iteration of the timing optimization and it is set initially to true. Based on the delay target, each critical PO has a negative slack. In one embodiment, these critical POs are sorted in non-ascending order according to their slack. This order ensures that the POs that have bigger negative slack values and, thus, are easier to speed up, are processed before those POs that have smaller negative slack values and, thus, are more difficult to speed up.

For example, if there are three critical POs with slack values of −2, −1 and −3, respectively, then the PO with the slack of −1 is processed first, and the PO with the slack of −3 is the last to be processed. The rationale for this ordering is that after processing the POs that are easier to speed up by local transformations, the delay savings resulting from those transformations may be used or shared by the delay optimization of those POs that are more difficult to speed up so that the POs with smaller negative slacks may be sped up in the same iteration as those POs with bigger negative slack values. This strategy is very effective and permits a big delay reduction step (reduce_step) to be used, which results in both area savings and delay reductions.

Proceeding to process 708, for each critical PO v and its delay target, a recursive delay reduction (reduceDelay) procedure is invoked. Process 708 will be further described in conjunction with FIG. 6. If the delay of the critical PO v is successfully reduced by local transformations in its transitive fanins, as determined at a decision state 710, process 700 proceeds back to state 706 to operate on the next critical PO. Otherwise, the flag success is set to false and there is no need to continue the delay reduction for the remaining POs.

Continuing at state 706, if the delay targets of all the critical POs are met, the circuit delay (ckt_delay) is set to the current delay target ckt_delay_target and the next iteration of timing optimization may begin. If the delay target is not met for one or more POs, the delay reduction step (reduce_step) may be adjusted to a less aggressive value, which may be done in a customized manner (e.g., each time decremented by a constant value). Preparation for the next iteration may then be performed, possibly including a recovery to the previous netlist without conducting the partial transformations.

Figure 6:
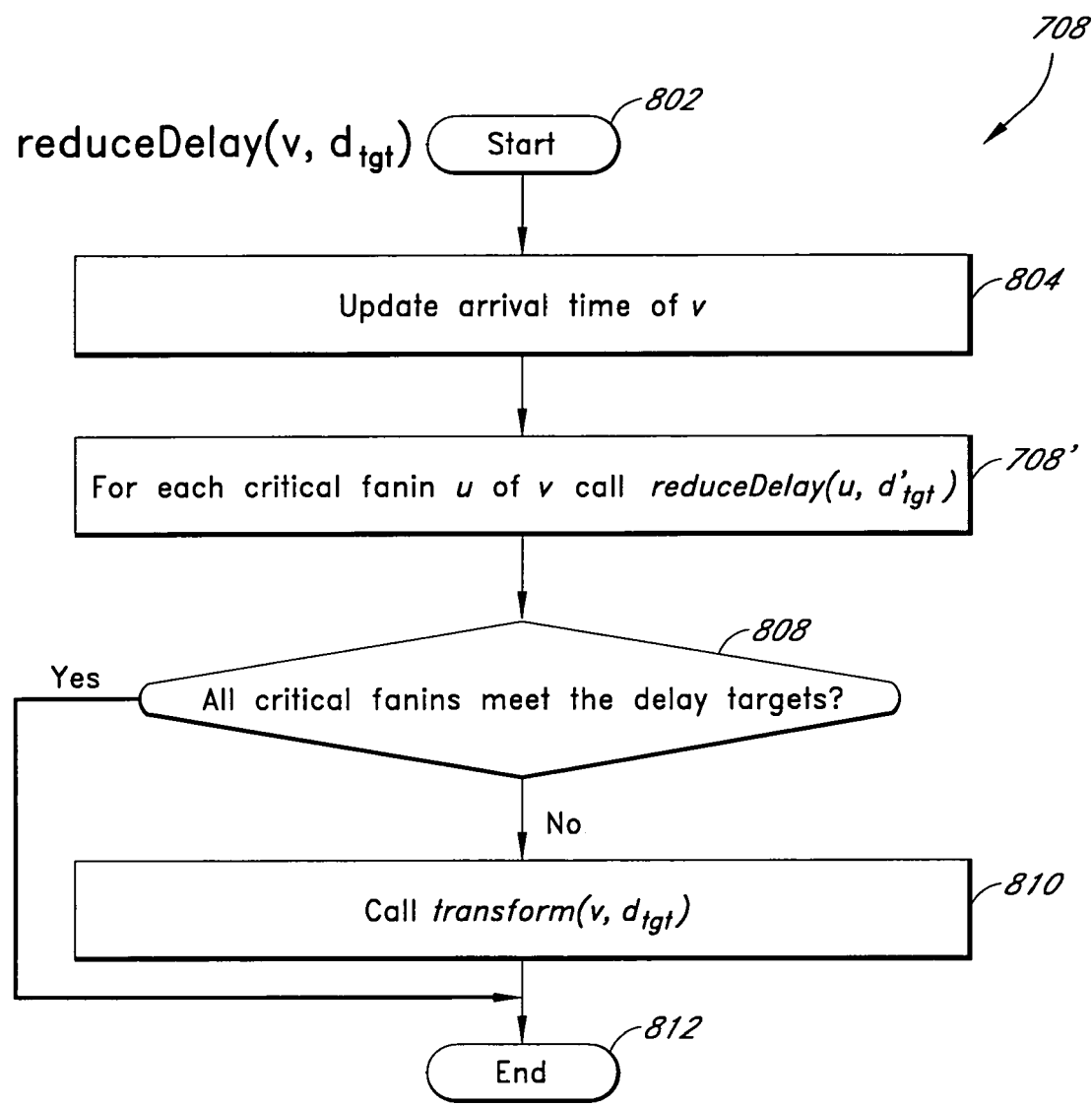
FIG. 6 is a flow chart of the recursive delay reduction process (reduceDelay) shown in FIG. 5.

Referring to FIG. 6, the recursive delay reduction (reduceDelay) process 708 for a node v with respect to a specific delay target delay_target will now be described. Portions of process 810 (described hereinbelow) may be customized by a specific timing optimization method, such as timing-driven decomposition, timing-driven cofactoring, generalized bypass transform, or timing-driven simplification. One embodiment of the process 708 may be performed by the pseudo-code shown in Table III.

TABLE III procedure reduceDelay(v, delay_target)

1 update the arrival time t(v) of v according to its fanins' arrival times
2 if t(v) ≦ delay_target then
3    return true
4 if v is a primary input then
5    return false
6 for each fanin u ∈ input(v) in non-ascending order according to the current slack do
7    fanin_delay_target = delay_target − $d_i$(v) − d(u, v)
       /* u is v's ith fanin node */
8    if t(u) > fanin_delay_target then
9       if reduceDelay(u, fanin_delay_target) == false then
10         return transform(v, delay_target)* /* transform returns true if delay_target is met, otherwise, it returns false */
11 update the arrival time t(v) of v according to its fanins' arrival times
12 return true
   recursive delay reduction for a node with respect to a delay target Beginning at a start state 802, process 708 moves to state 804 and updates the arrival time t(v) of node v according to its fanins' arrival times, corresponding edge delays and pin-to-pin delays (refer to Problem Formulation section above). This update is performed as some of the fanins of node v may have been sped up during the timing optimization on other critical paths. If the updated arrival time already meets the delay target, then a Boolean true is returned. If v is a primary input, then a Boolean false is returned indicating that v cannot speed up. Otherwise, the fanins of node v are sorted in non-ascending order according to their slack values, in one embodiment. This order ensures that the fanins that have bigger negative slack values and are easier to speed up are processed before those fanins that have smaller negative slack values and are more difficult to speed up. For example, if v has two fanins $u_1$ and $u_2$ with slack of −2, −1, respectively. Then the fanin $u_1$ with slack of −1 is processed first, and the fanin $u_2$ with slack of −2 is the last to be processed. The rationale for this ordering is similar to that of the critical PO ordering used in the newTimingOptimize process 700.

A feature of the reduceDelay process 708 is that in order to reduce the delay for node v, instead of conducting the local transformation for v directly, the process recursively reduces the delay of the critical fanins of v, where possible. It is clear that in this procedure, the transformations closer to the primary inputs are preferred.

For each fanin u of node v, its delay target (fanin_delay_target) is computed according to the delay target for v, the pin-to-pin delay $d_i$ (assuming that u is the ith fanin of node v) and the edge delay d(u,v). For a fanin u with t(u)> fanin_delay_target, a reduceDelay process 708' is invoked on u for a recursive delay reduction. Continuing at a decision state 808, if for some fanin u of v, the delay reduction is not successful, then the reduceDelay process 708 stops trying to reduce the delay for other critical fanins of v. Instead, process 708 proceeds to a transform process 810 to conduct the local transformation on the node v itself, with the goal of hitting the delay target.

Figure 7:
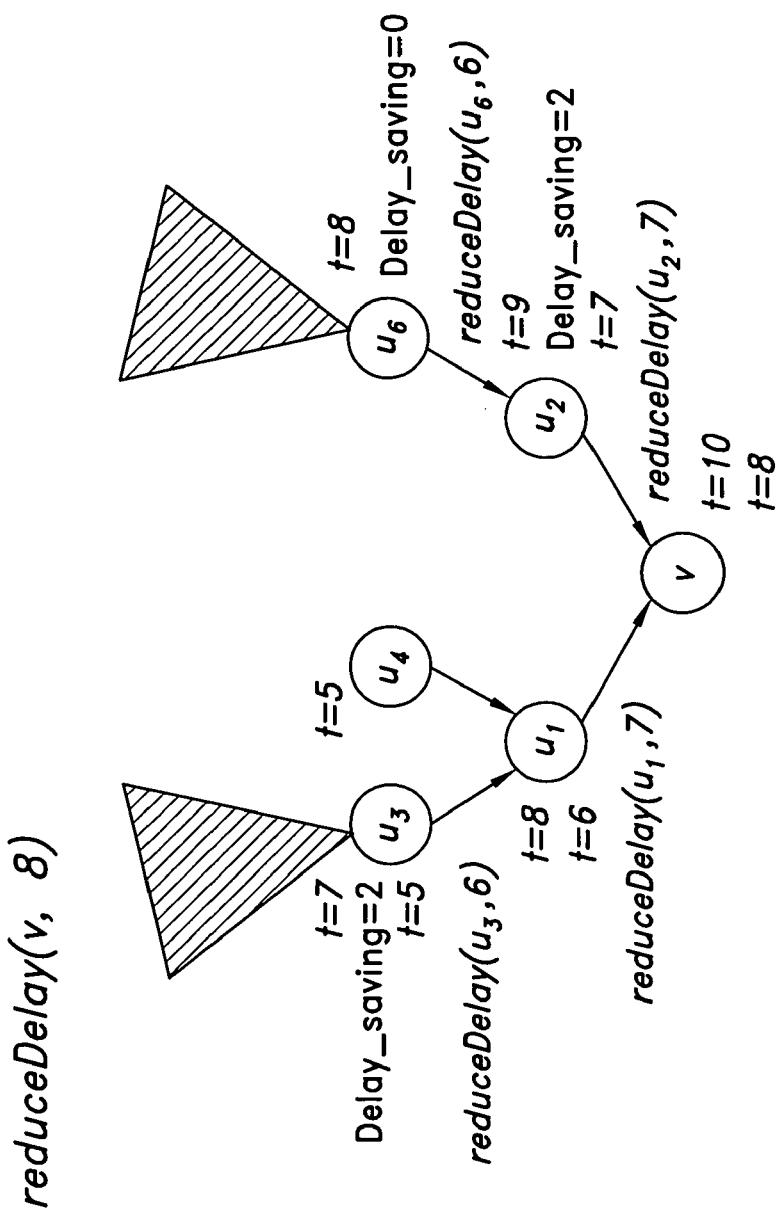
FIG. 7 is a diagram showing exemplary results of executing the recursive delay reduction process reduceDelay shown in FIG. 6.

An example of recursive delay reduction is shown in FIG. 7. The arrival times t=7 at fanin u3, t=8 at u1, t=8 at u6, t=9 at u2 and t=10 at v represent initial arrival times before delay reduction for the exemplary logic circuit. After delay reduction, the final arrival times are t=5 at u3, t=5 at u4, t=6 at u1, t=7 at u2 and t=8 at v. After applying a local transformation at node u2 as part of the delay reduction process, u2 no longer depends on u6 (u6 is not the fanin of u2 any more) and u2's arrival time is reduced from t=9 to t=7 so that the arrival time of v is t=7+1=8.

If it turns out that all the critical fanins of node v can be sped up to meet their delay targets as determined at the decision state 808, then there is no need to conduct any transformation on v itself. Instead, the arrival time t(v) of v is directly updated and a Boolean true is returned indicating that the delay reduction for node v with respect to the delay target was successful.

From the above description of the novel methodology of the timing optimization based on the iterative refinement, it will be understood by one of ordinary skill in the art that it is general enough to consider different pin-to-pin delays and distinctive edge delays. This general procedure may be customized for any time-driven optimization that adopts the iterative refinement-based approach. In the next subsection, this procedure is applied to the timing optimization during the technology independent stage. The experimental results show that this new method produces very favorable results compared to conventional algorithms.

The novel methodology for the general timing-driven iterative refinement-based approach has the following advantages, though particular embodiments may include only some of the advantages:
1. It reduces or completely eliminates the need for the (incremental) timing analysis during the iterative refinement procedure.
2. It allows the local transformation to be able to see more accurate timing information (e.g., the arrival times at the transitive fanin signals) so that the transformations may be conducted in a more meaningful way to reduce the circuit delay.
3. Its flexibility makes it much easier to consider the design preferences (e.g., in hybrid FPGAs with both LUT clusters and Pterm blocks, it is better to use the same logic resources consecutively on a critical path so that the subsequent clustering procedure may pack these implementations into one cluster to reduce the circuit delay.)
4. It provides a general framework to integrate several types of local transformations, such as logic resynthesis, mapping, clustering, and so on, to enable an integration of currently separate design processes.

B. Application to Timing-Driven Optimization

Based on the timing optimization framework presented in the previous subsection, the novel method, termed herein TDO (timing-driven optimization), for optimizing the circuit depth after the area oriented logic optimization will now be further described. In one embodiment, the input to TDO is a 2-bounded netlist and the output of TDO is also a 2-bounded netlist. The novel method may be obtained by (i) customizing portions of states 704 and 706 (FIG. 5) and process 810 (FIG. 6), and (ii) performing the area recovery after each successful circuit delay reduction.

The customization involves portions of states 704 and 706 of the newTimingOptimize process 700 (FIG. 5) and process 810 of the reduceDelay process 708 (FIG. 6). The customization of state 704 in newTimingOptimize process 700 is to determine the initial delay reduction step reduce_step, which is adjusted to a less aggressive value if a failure occurs in meeting the delay target based on the current reduction step. The value reduce_step may be any number from one to the overall desired delay reduction that is the difference between the initial circuit delay and the ultimate delay target. If reduce_step is too small, for example, one (1), the timing optimization may proceed in a very slow fashion, which has several drawbacks:

The critical path information during one iteration of the circuit delay reduction is rather limited as it does not consider the forthcoming critical paths after the current iteration, which, if explored together with the current critical paths, may yield more optimal results for the area and also the delay in the long run of the timing optimization.

The overall timing optimization time would be long.

However, if reduce_step is too large, the timing optimization works on a large set of critical nodes. However, it is unlikely that the delay target can be achieved, in which case reduce_step has to be adjusted to a less aggressive value and the whole procedure has to be restarted. One can use the well-known method described in (Singh, K. J., Performance Optimization of Digital Circuits, *Ph.D. Dissertation, University of California at Berkeley*, 1992) to compute the lower bound of the delay reduction at the beginning of every iteration and use that as reduce_step. However, computing the lower bound of the delay reduction involves conducting the transformations on every critical node, which may be a time consuming process, especially when the timing optimization approaches the end, where more nodes become critical. In the experimental results, an empirical value of four (logic levels) is chosen beforehand as the initial reduce_step.

The customization of state 706 in the newTimingOptimize process 700 involves adjusting reduce_step to a less aggressive value if a failure occurs in meeting the delay target based on the current reduction step. This may be accomplished by decrementing reduce_step by one or some other predetermined value. The resultant reduce_step may be used as the next delay reduction step.

Further customization of state 706 in the newTimingOptimize process 700 is performed if the delay target cannot be achieved for some PO. If so, the previous netlist is advantageously recovered as the starting point to the next delay reduction iteration based on a less aggressive reduce_step without conducting the partial transformations (transformations may have been conducted on some nodes to reduce their delays.).

The customization of process 810 in the reduceDelay process 708 involves determining the transformation method, i.e., which type of transformation is to be performed to reduce the delay of node v to meet its delay target. The transformations that alter the structure of a part of the circuit, such that the delay through the part is reduced, include, but are not limited to:
1. Timing-driven decomposition. As is well known in the art, timing-driven decomposition decomposes a complex function f into a Boolean network composed of 2-input functions having minimum delays. This is done primarily through the extraction of divisors that are good for timing. Whether a divisor is good or not depends on the arrival times of its supporting inputs and the area saving it may provide. A good divisor should not have late arriving signals as its inputs. The best divisor g is chosen each time and substituted into f. The function g is then decomposed recursively, followed by the recursive decomposition of the resulting function f. The choice of divisors that are evaluated affects the quality of the decomposition. Algebraic divisors, such as kernels or two-cube divisors, are well-known techniques that may be used for the extraction. If, after a predetermined number of attempts, the dividend function v does not have any good divisors, v is a sum of disjoint-support product terms and its decomposition into 2-input functions may be performed using a conventional Huffman-tree based structural decomposition procedure.
2. Timing-driven cofactoring. The timing-driven cofactoring technique is a well-known technique for performing optimization. Given a function f, the latest arriving input x is determined. f is then decomposed as $f = xf_x + x'f_{x'}$ (6) ($f_x$ is f with the input x set to one, and $f_{x'}$ is f with x set to zero). A straightforward implementation realizes $f_x$ and $f_{x'}$ independently, which may result in a large area overhead. The overhead may be reduced if logic sharing between $f_x$ and $f_{x'}$ is considered. This technique is a generalization of the design of a carry-select adder technique.
3. Generalized bypass transform. The basic idea in this method is to change the structure of the circuit in such a way that transitions do not propagate along the long paths in the circuit. Given a function f and a late arriving input x, $g = f_x \oplus f_{x'}$ represents conditions under which f depends on x. g is then used as the select signal of a multiplexer, whose output is f. If g is one, the output f is simply x or x'. If g is zero, the output is the function f with x set to either zero or one. The long path that depended on x is replaced by the slower of the two functions: g and g with x set to a constant. This transformation is a generalization of the technique used in a carry-bypass adder.

4. Timing-driven simplification. As discussed above, this simplification computes a smaller representation of a function using a don't care set that is derived from the network structure and also possibly from the external environment. The goal of timing-driven simplification is to compute a representation that leads to a smaller delay implementation. This may be achieved by removing late arriving signals from the current representation using appropriate don't care minterms, and substituting therefore early arriving signals.

The transformation based on the timing-driven decomposition may generally produce the best results in terms of the delay reduction among the transformations listed above. Therefore, the timing-driven decomposition is used in process 810 method with kernels as possible divisors.

Figure 8:
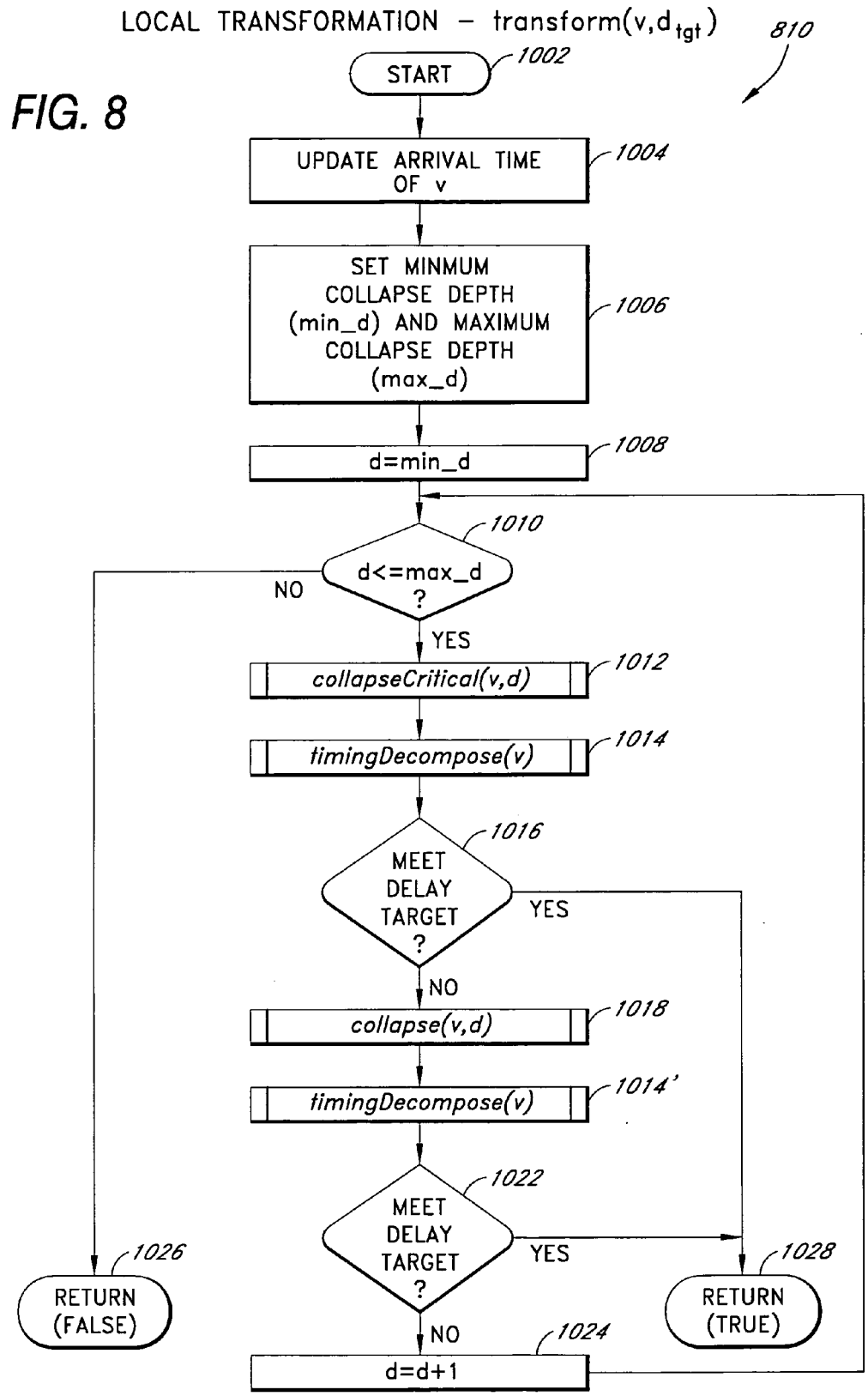
FIG. 8 is a flow chart of the local transformation process (transform) shown in FIG. 6.

Based on the above discussion, the customization of process 810 (transform(v, delay_target) in reduceDelay (FIG. 6) is shown in FIG. 8. One embodiment of the process 810 may be performed by the pseudo-code shown in Table IV.

TABLE IV procedure transform(v, delay_target)

1  update the arrival time t(v) of v according to its fanins' arrival times
2  if t(v) ≦ delay_target then
3      return true
4  if v is a primary input then
5      return false
6  set the minimum collapse depth min_d and maximum collapse depth max_d
7  d = min_d
8  while d ≦ max_d do
9      collapseCritial(v, d)
10     timingDecompose(v)
11     if t(v) ≦ delay_target then
12         return true
13     collapse(v, d)
14     timingDecompose(v)
15     if t(v) ≦ delay_target then
16         return true
17     d = d + 1
18 return false
       delay reduction for a node with respect to a delay target Beginning at start state 1002, process 810 moves to state 1004 and updates the arrival time of node v. Proceeding to state 1006, in order to apply the timing-driven decomposition on node v, a transformation region that is a partial fanin cone of v is formed and collapsed into v. As in most of the other timing optimization algorithms, the collapse depth d is used to control the size of the transformation region. The choice of the collapse depth d certainly influences the quality of the TDO method. A large d is useful in making relatively large changes in the delay since a larger region that results in a more complex function provides greater flexibility in restructuring the logic. However, this results in both longer run time, due to the collapse operation and the timing-driven decomposition procedure, and a bigger area overhead as more logic is duplicated. An empirical value of three has been chosen for d in the past. Experimentation results show that when d is larger than three, the area overhead may be unwieldy. Therefore, in one embodiment, the maximum collapse depth is set to three, though other values may be used as well. If a smaller collapse depth may help meet the delay target, it can be used to reduce the area overhead. In one embodiment of the TDO method implementation, a value of two is used as the minimum collapse depth. Advancing to state 1008, a variable d is set to the value of min-d, e.g., two.

Given a certain collapse depth d, either the d-fanin-cone or the d-critical-fanin-cone, a subset of d-fanin-cone, may be used. Using the d-fanin-cone generally results in a better delay reduction as compared to using the d-critical-fanin-cone, with, however, a larger area overhead. In one embodiment, as the overall TDO method is run time efficient, the method tries to reduce delay using the d-critical-fanin-cone first, and if that fails, the d-fanin-cone is used. Proceeding to a decision state 1010, process 810 determines if d is less than or equal to the value of max-d, e.g., three. If so, process 810 moves to collapseCritical process 1012. The collapseCritical process 1012 collapses the d-critical-fanin-cone for v based on depth d. Collapsing a sub-netlist N' means to eliminate all the internal nodes of N' (but not the output nodes of N'). This is a well-known logic operation in multi-level logic optimization.

Continuing at a timingDecompose process 1014, the timing-driven decomposition is performed on v. Advancing to a decision state 1016 process 810 determines if the delay target is met. If so, the local transformation process 810 completes and returns with a true condition at state 1028. If the delay target is not met, as determined at decision state 1016, process 810 moves to a collapse process 1018. Process 1018 collapses the d-fanin-cone for v based on depth d. The collapse process 1018 is similar to that of the collapseCritical process 1012 except for the fan-in cone used in the processes. At the completion of process 1018, execution continues at timingDecompose process 1014', which is similar to process 1014 described above. If the delay target is met, as determined at a decision state 1022, process 810 completes and returns with a true condition at state 1028. If the delay target is not met, process 810 proceeds to state 1024 and increments depth d by one and moves back to decision state 1010 as described above. If d is determined to be greater than max_d at decision state 1010, process 810 completes without meeting the delay target and returns with a false condition at state 1026.

Another feature of TDO includes performing an effective area recovery after each successful circuit delay reduction. Each delay reduction iteration (states 706 to 710 (FIG. 5)) involves the transformations on a set of critical nodes, which result in the duplication of logic due to the collapsing. The area recovery feature removes the redundant nodes (2-input nodes for TDO) whose functions or the complements of the functions are already present in the network. This may be accomplished by performing a restricted resubstitution, i.e., g is resubstituted into f only if f=g or f=g'. A sweep operation following the resubstitution may remove the buffers and inverters generated by the resubstitution so that the delay at every node in the circuit may not be increased while the circuit area is reduced.

In summary, the TDO method integrates the novel mechanism for the general iterative refinement flow and the area recovery technique using the restrictive iterative resubstitution. It outperforms the state-of-the-art algorithms consistently while significantly reducing the run time.

Application to PLD Synthesis

A. Application of Timing Optimization to the Traditional PLD Synthesis Flow

With the novel method presented for the timing optimization during the technology independent stage, which have proved to be very efficient and generate solutions with superior qualities than conventional algorithms, it would be worthwhile and interesting to analyze the impact of technology independent timing optimization on the circuit performance after technology mapping, clustering and layout design.

Using the TDO method, the impact of the timing optimization on the subsequent technology mapping was analyzed. The operation of $Opt_{area}$ is a technology independent area optimization, which is comparable to the area optimization script script.algebraic in SIS (Sentovich et al., *SIS: A System for Sequential Circuit Synthesis*, Electronics Research Laboratory, Memorandum No. UCB/ERL M92/41, 1992). The comparison of the optimization results is based on the resulting 2-bounded netlists. The comparison of the mapping results are based on the mapping into a 4-LUT FPGA that is performed by the state-of-the-art algorithm that is able to achieve the optimal depth while minimizing the mapping area (Hwang, Y.-Y., Logic Synthesis for Lookup-Table Based Field Programmable Gate Arrays, *Ph.D. Dissertation, University of California at Los Angeles*, 1999). The technology independent timing optimization by TDO reduced the circuit depth ($d_o$) obtained by $Opt_{area}$ by 56% with a 6% area increase ($a_o$). After the technology mapping, the delay reduction is decreased from 56% after the optimization to 30% ($d_m$) with an overall 13% increase on area ($a_m$). Of course, in other examples, these numbers may vary.

The impact of the timing optimization on clustering and the final layout design was analyzed. The clustering is an optimization step to physically group the mapped 4-LUTs into the clusters of an FPGA. In this example, it is assumed that each cluster has ten 4-LUTs, which is the same as the LAB structure in an APEX 20K device. The comparison of the clustering results are based on the duplication-free clustering performed by the algorithm that is able to achieve the optimal delay for all the reported benchmarks. The delay after clustering ($d_c$) is estimated by a timing analysis tool that considers the LUT logic delay, the intra-cluster interconnection delay and the inter-cluster interconnection delay. The final layout may be performed by the Quartus version 2000.03 from Altera on the EPF20K400BC652-2 device. Using the present invention, the delay reduction is further decreased from 30% after the mapping to 15% ($d_c$) after the clustering and 12% after the final layout design ($d_l$). As long as the mapping is completed, the circuit logic area will not change much, meaning that the packing ratio (the average number of LUTs packed into one cluster) achieved by the clustering is more or less a constant.

Figure 9:
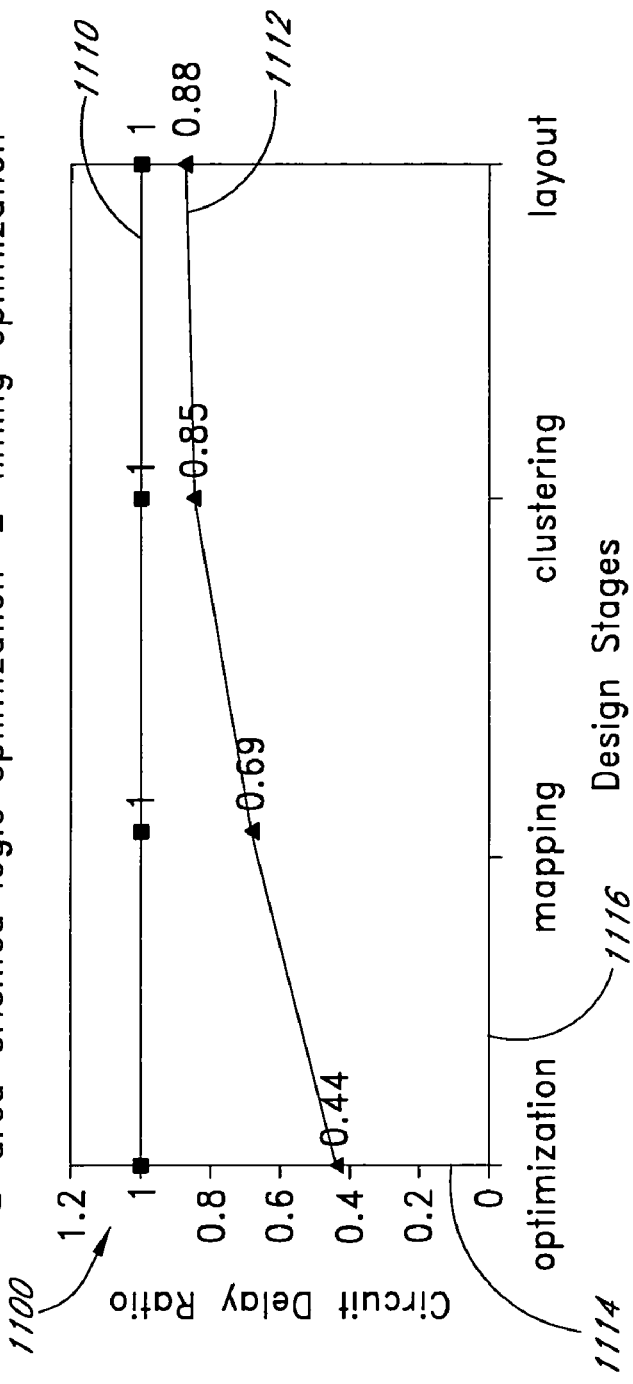
FIG. 9 is a graph showing the impact of timing optimization on clustering and final layout design in relation to area-oriented logic optimization.

FIG. 9 summarizes the impact of the timing optimization on clustering and the final layout design. In general, if the overall design process is separated into several design optimization stages, such as the technology independent optimization, mapping, clustering, and place and route, to be performed sequentially, the delay reduction obtained in the earlier stages will not be preserved after the optimization by the later stages. The reason has been that the optimization done in each stage tends to reduce the delay along the critical paths resulted from the previous design stages. Therefore, a circuit with a much longer critical path depth resulting from the pure area optimization in the technology independent optimization stage gets optimized more than the circuit with a smaller depth achieved by the timing optimization in the subsequent mapping, clustering and layout design.

Furthermore, each cluster typically has capacity constraints and also pin constraints. Therefore, both circuit depth and area may have an impact on the clustering, and ultimately it is the circuit topology that affects the overall clustering performance, which is difficult to consider during the technology independent timing optimization.

A graph 1100 shows a comparison between the pure area-oriented logic optimization (line 1110) and area-plus-timing optimization (line 1112) on the circuit delay after optimization, mapping, clustering and layout design. The Y-axis 1114 represents circuit delay ratio (discussed below) and X-axis 1116 represents certain design stages, including optimization, mapping, clustering and layout. The absolute delay values for area-oriented logic optimization are all scaled to one (line 1110), and the absolute delay values for area-plus-timing logic optimization are all scaled accordingly. As an example of what is meant by delay ratio, 0.44 point on line 1112 means that with timing optimization, the delay after optimization is only 44% of the delay achieved by pure area optimization.

On the other hand, analysis results suggest that the estimated delay after the circuit clustering ($d_c$) correlates reasonably well, in terms of the relativity, with the layout delay ($d_l$). A clustering-driven synthesis flow is described in the next section, which considers the effect of the mapping and clustering during the timing optimization.

B. Application to a Novel Layout-Driven Synthesis Flow

A layout-driven synthesis flow that considers the effect of technology mapping and circuit clustering during the technology independent timing optimization will now be described. This layout-driven synthesis flow makes use of mapping and clustering to help detect the circuit topology and uses the resulting inter-cluster edges (i.e., the edges whose terminals are spread in different clusters) and their delays as guidance for the timing optimization procedure. To ensure that the changes made during the timing optimization are incremental and will finally converge to a delay reduction after the mapping and clustering, the timing optimization is performed within each cluster. In one embodiment, FPGAs with hierarchical programmable interconnection (PIC) structures are targeted.

Figure 10:
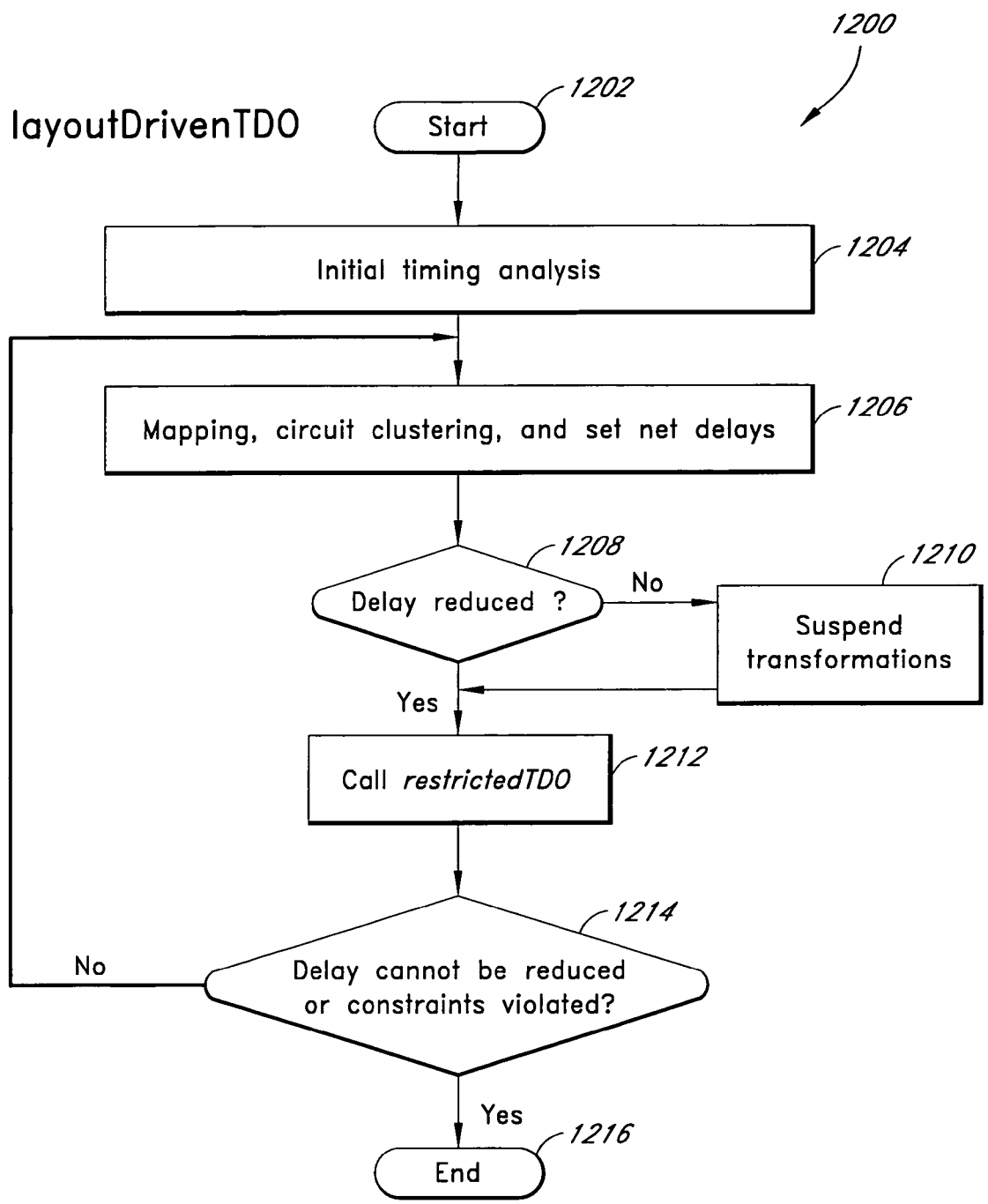
FIG. 10 is a flow chart of a novel layout-driven timing optimization process (layoutDrivenTDO).

FIG. 10 shows the overall flow of a layoutDrivenTDO process 1200. One embodiment of the process 1200 may be performed by the pseudo-code shown in Table V.

TABLE V procedure layoutDrivenTDO(N)

```
 1  timingDecompose(N, 2)
 2  old_ckt_delay = ∞
 3  repeat
 4      N' = duplicate(N)
 5      mapping(N')
 6      clustering(N')
 7      do a timing analysis on N' and circuit_delay
             is the maximum arrival time in the circuit
 8      if ckt_delay < old_ckt_delay then
 9          old_ckt_delay = ckt_delay
10          annotate net delays on N based on the clustering results an N'
11      else
12          N = N" /*N" is the 2-bounded netlist saved before
              the last TDO*/
13          suspend the transformations on N' done in the last TDO
14          N" = duplicate(N)
15          restrictedTDO(N)
16  until the delay cannot be reduced or constraints are violated
             layout-driven timing optimization procedure
```

Beginning at a start state 1202, process 1200 moves to state 1204 where the netlist N is decomposed into a 2-bounded netlist. A variable old_ckt_delay, indicating the circuit delay after clustering before the last timing optimization, is initially set to infinity. Each timing optimization iteration consists of the operations from state 1206 to state 1214. The first operation in each iteration is to duplicate the 2-bound netlist N to N' at state 1206. N' may be optimized in the subsequent mapping and clustering procedure. A timing analysis is conducted on the mapped and clustered netlist N' to compute the arrival times for every node in N'. The circuit delay after clustering, denoted as ckt_delay, is the maximum arrival time.

If the circuit delay (ckt_delay) after the last timing optimization, mapping and clustering is indeed better than the previous one (old_ckt_delay), as determined at a decision state 1208, the last timing optimization is considered to be good. Thus, old_ckt_delay is updated to the current delay and the net delays in the 2-bounded netlist N are set up based on the clustering results of N'. Therefore, the delay model used during the timing optimization is the same as the one used by the circuit clustering.

If the circuit delay (ckt_delay) after the last timing optimization, mapping and clustering does not improve over the previous one (old_ckt_delay) as determined at decision state 1208, the last timing optimization is considered to be bad. Thus, the netlist N is reversed back to the 2-bounded netlist N" saved before the last timing optimization at state 1210 and the transformations done in the last timing optimization are suspended. Before the next timing optimization, the netlist N is duplicated to N". A restricted timing optimization is then performed on N at a restrictedTDO procedure 1212, where, in one embodiment, the suspended transformations are not considered and the optimization is only done within each cluster, which means that any local restructuring does not go across the cluster boundary. If the delay cannot be further reduced or the constraints are violated, as determined at decision state 1214, process 1200 completes at an end state 1216.

At the end of the layoutDrivenTDO(N) process 1200, the netlist N is a 2-bounded netlist that has been optimized for delay with the consideration of the potential impact on the subsequent mapping and clustering.

In summary, compared with the traditional timing optimization flow, the layout-driven synthesis flow that considers the effect of technology mapping and circuit clustering during the technology independent timing optimization has the following advantages and differences.

1. The flow layoutDrivenTDO 1200 makes use of the mapping and clustering to help detect the circuit topology and uses the resulting inter-cluster edges and their delays as the guide for the timing optimization procedure. Traditional timing optimization does not consider these factors.
2. In contrast to traditional methods, to ensure that the changes made during the timing optimization are incremental and will finally converge to a delay reduction after the mapping and clustering, the timing optimization in layoutDrivenTDO 1200 is performed within each cluster.
3. In the procedure restrictedTDO 1212 of the flow, the suspended transformations, which may harm or have no evident benefit in reducing the circuit delay, are not considered. Traditional timing optimization does not suspend any transformations since no information is available indicating whether a transformation is good or not.
4. In the procedure restrictedTDO, the net delays in the 2-bounded netlist N are set up based on the clustering result. Thus, the delay model used during the timing optimization is the same as the one used by the circuit clustering. The edge delays in traditional timing optimization are zero.

Experimental Results and Comparative Study

To effectively carry out the experimentation, a set of benchmarks are first selected. Twenty eight benchmark circuits, which are among the largest in the MCNC benchmark suite (Yang, S., *Logic Synthesis and Optimization Benchmarks User Guide Version* 3.0, Technique Report, MCNC, January 1991), are selected for the experimentation.

A comparison was performed between TDO and the SIS speedup algorithm (Singh, K. J., Performance Optimization of Digital Circuits, *Ph.D. Dissertation, University of California at Berkeley*, 1992) on the benchmark circuits. On average, the solutions generated by speedup have 10% more delay and 14% more area after the optimization, and have comparable circuit delay but with 10% more area compared to the solutions obtained by TDO. Furthermore, TDO spent much less time in achieving these high quality solutions.

A comparison was performed between TDO and the RERE algorithm (Pan, P., Performance-Driven Integration of Retiming and Resynthesis, in *Proc. Design Automation Conf.*, pages 243–246, 1999) on the combinational circuits. The RERE algorithm performs retiming for sequential circuits. On average, the solutions generated by RERE have 19% more delay and 25% more area after the optimization, and have 6% more delay and 25% more area than the solutions obtained by TDO.

It is concluded that the TDO method is able to achieve solutions with superior qualities compared with the state-of-the-art timing optimization algorithms.

A further interest is to understand the impact of the timing optimization on the circuit delay after the layout design. Although the timing optimization is very effective in optimizing the circuit depth during the technology independent stage, it may cause the circuit delay to increase if the layout effect is ignored during optimization. Therefore, the layout-driven synthesis flow was described above. A comparison of the area optimization ($opt_{area}$), timing optimization (TDO) and clustering-driven timing optimization (layoutDrivenTDO) was performed. Although there is no dramatic delay reduction, layoutDrivenTDO is able to achieve better area and better delay results compared to TDO which does not consider the layout effect.

Finally, a comparison was performed between the synthesis flow (layoutDrivenTDO) and Quartus. On average, the synthesis flow obtains 16% better delay results and 10% better area results compared to the Quartus results.

CONCLUSIONS AND DISCUSSIONS

The novel methodology for the general timing-driven iterative refinement-based approach has the following characteristics and advantages:

1. It reduces or eliminates the need for the (incremental) timing analysis during the iterative refinement procedure.
2. It allows the local transformation to be able to see more accurate timing information (e.g., the arrival times at the transitive fanin signals) so that the transformations can be conducted in a more meaningful way to reduce the circuit delay.
3. Its flexibility makes it much easier to consider the design preferences (e.g., in hybrid FPGAs with both LUT clusters and Pterm blocks, it is better to use the same logic resources consecutively on a critical path so that the subsequent clustering procedure can pack these implementations into one cluster to reduce the circuit delay.)

4. It provides a general framework to integrate several types of local transformations, such as logic resynthesis, mapping, clustering, and so on, to enable an integration of currently separated design processes.

The TDO method integrates the novel mechanism for the general iterative refinement flow and the area recovery technique using the restrictive iterative resubstitution. It is generally able to outperform the state-of-the-art algorithms consistently while significantly reducing the run time.

Specific blocks, flows, devices, functions and modules may have been set forth. However, one of ordinary skill in the art will realize that there are many ways to partition the system of the present invention, and that there are many parts, components, flows, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of reducing circuit timing delays, comprising:
   selecting a first node;
   sorting fanins of the first node according to corresponding associated slack values, wherein at least a portion of the slack values differ in value; and
   reducing delays, via a delay reduction process, associated with the sorted fanins having relatively larger negative slack values before reducing delays associated with the sorted fanins having relatively smaller negative slack values, wherein the delay reduction improves circuit performance.

2. The method defined in claim 1, wherein reducing delays is performed recursively.

3. The method defined in claim 2, wherein recursively reducing delays is performed until the delays cannot be further reduced or timing constraints are violated.

4. The method defined in claim 1, wherein selecting the first node comprises:
   performing a timing analysis on a circuit;
   determining a delay target based at least in part on the timing analysis;
   determining a slack value for each critical node of the circuit based on the delay target; and
   sorting the critical nodes based on the corresponding slack values.

5. The method defined in claim 4, wherein selecting the first node further comprises selecting a critical node having the largest negative slack.

6. A method of reducing circuit timing delays, comprising:
   selecting a first node;
   identifying critical fanins of the first node; and
   recursively reducing delays associated with at least a portion of the critical fanins of the first node, wherein the delay reduction improves circuit performance.

7. The method defined in claim 6, wherein recursively reducing delays is performed on critical fanins having relatively larger negative slack values before reducing delays associated with fanins having relatively smaller negative slack values.

8. The method defined in claim 6, additionally comprising performing a local transformation on the first node if the reducing delays for at least one of the critical fanins is not successful.

9. A method of performing circuit delay reduction, comprising:
   performing a timing analysis on a circuit;
   determining a delay target based at least in part on the timing analysis;
   selecting a first output having a negative slack based at least in part on the delay target and the amount of first output negative slack relative to the slack of other outputs; and
   performing local transformations on transitive fanins of the first output to improve the negative slack via a local transformation process, and thereby improve circuit performance.

10. The method defined in claim 9, wherein the first output is a critical output.

11. A method of reducing timing delays for a circuit having primary input (PI) nodes, at least one primary output (PO) node, and a set of circuit nodes between the PI nodes and the PO node(s), the method comprising:
    a) identifying a first critical path between a first PI node and a first PO node, wherein the first critical path is selected based on ordering the PO nodes by corresponding slack values;
    b) beginning at the first PO node, attempting to reduce a delay associated with a first circuit node via a delay reduction process;
    c) determining if the delay reduction meets a first predetermined criteria;
    d) identifying a following circuit node in the critical path if the predetermined criteria is not met;
    e) attempting to reduce a delay associated with the following circuit node to improve circuit performance;
    f) repeating c), d) and e) until the delay cannot be reduced or a set of constraints are violated;
    g) identifying a second critical path between a second PI node and a second PO node, wherein the second critical path is selected based on the ordered PO nodes;
    h) determining an amount of delay reduction still needed for the second critical path after applying the results of the delay reduction for the first critical path; and
    i) beginning at the second PO node, attempting to reduce a delay associated with a second circuit node to improve circuit performance.

12. The method defined in claim 11, wherein a critical path is a path that needs to be reduced in delay so as to meet a target timing constraint.

13. The method defined in claim 11, additionally comprising establishing the criteria.

14. The method defined in claim 11, wherein the method is performed at a logic optimization phase of a circuit design process.

15. The method defined in claim 11, wherein the method is performed at a mapping phase of a circuit design process.

16. The method defined in claim 11, wherein the method is performed at a layout phase of a circuit design process.

17. The method defined in claim 11, wherein the first PI node and the second PI node are the same.

18. The method defined in claim 11, wherein the first PO node and the second PO node are the same.

19. The method defined in claim 11, wherein a portion of the first critical path overlays a portion of the second critical path.

20. A method of dynamically reducing delays on a critical path of a circuit topology, the method comprising:
   identifying a critical path of the circuit topology;
   selecting a delay target for a primary output associated with the critical path;
   dynamically reducing a first critical path delay at a first node in closer proximity to a primary input associated with the critical path than to a node in closer proximity to the primary output;
   storing the reduced delay;
   recursively dynamically reducing a second critical path delay beginning at a second node located between the first node and the primary output via a delay reduction process based at least in part on the stored reduced delay; and
   storing the reduced second path delay time.

21. The method defined in claim 20, wherein the circuit topology is associated with a standard cell design process.

22. The method defined in claim 20, wherein the circuit topology is associated with a gate array design process.

23. The method defined in claim 20, wherein the circuit topology is associated with a programmable logic design process.

24. A layout-driven logic synthesis design flow, comprising:
   selecting a desired circuit delay associated with a first output of a circuit path, wherein other outputs are associated with different initial circuit delays;
   calculating an initial circuit delay associated with the first output; and
   iteratively reducing the initial circuit delay to achieve the desired circuit delay using a timing optimization process, wherein in an iteration, mapping and clustering are used to measure the outcome of the timing optimization procedure, and wherein the timing optimization process uses such measurements to achieve the desired delay, and wherein the result of an iteration of delay reduction is used by a next iteration of delay reduction to determine an amount of delay to reduce.

25. The method defined in claim 24, wherein the design flow is associated with a standard cell design process.

26. The method defined in claim 24, wherein the design flow is associated with a gate array design process.

27. The method defined in claim 24, wherein the design flow is associated with a programmable logic design process.

28. The method defined in claim 1, additionally comprising performing a local transformation on the first node if the reducing delays for at least one of a set of fanins with negative slack values of the first node is not successful.

29. The method defined in claim 1, wherein reducing delays associated with the fanins of the first node is performed before any local transformation of the first node.

30. The method defined in claim 1, wherein sorting fanins of the first node includes sorting fanins of the first node in order according to slack values associated with the corresponding fanins.

31. The method defined in claim 1, wherein reducing delays associated with the fanins of the first node comprises:
   a) computing a delay target for each of the fanins;
   b) determining if an arrival time for a one of the fanins is greater than the delay target for the one fanin;
   c) performing a delay reduction on the one fanin recursively if the arrival time for the one fanin is greater than the delay target for the one fanin; and
   d) repeating b) and c) for a next fanin of the first node.

32. The method defined in claim 31, wherein reducing delays associated with the fanins of the first node further comprises stopping after c) if the delay reduction of one of the fanins is not successful.

33. The method defined in claim 31, wherein the delay target for a particular fanin is based on a delay target of the first node, a pin-to-pin delay of the particular fanin, and an interconnect delay from the particular fanin.

* * * * *